US007643786B2

(12) United States Patent
Söderbacka et al.

(10) Patent No.: US 7,643,786 B2
(45) Date of Patent: Jan. 5, 2010

(54) ENABLING A CONTENT PROVIDER INITIATED CONTENT DELIVERY VIA A SPECIFIC RADIO ACCESS NETWORK

(75) Inventors: Lauri Söderbacka, Espoo (FI); Ville Warsta, Helsinki (FI)

(73) Assignee: Nokia Corporation, Espoo (FI)

( * ) Notice: Subject to any disclaimer, the term of this patent is extended or adjusted under 35 U.S.C. 154(b) by 10 days.

(21) Appl. No.: 10/510,323

(22) PCT Filed: Apr. 3, 2002

(86) PCT No.: PCT/IB02/01046

§ 371 (c)(1),
(2), (4) Date: Jun. 15, 2005

(87) PCT Pub. No.: WO03/084261

PCT Pub. Date: Oct. 9, 2003

(65) Prior Publication Data

US 2005/0215246 A1   Sep. 29, 2005

(51) Int. Cl.
*H04B 7/185* (2006.01)
*H04B 1/38* (2006.01)
*H04M 1/00* (2006.01)
*H04H 40/00* (2008.01)
*H04H 20/71* (2008.01)
*H04W 36/00* (2009.01)

(52) U.S. Cl. ............ 455/3.01; 455/12.1; 455/90.3; 455/575.1; 455/3.06; 455/552.1; 455/439

(58) Field of Classification Search ............ 455/436, 455/552.1, 3.01, 3.06, 439, 12.1, 90.3, 575.1
See application file for complete search history.

(56) References Cited

U.S. PATENT DOCUMENTS 5,737,703 A * 4/1998 Byrne .................. 455/442

(Continued)

FOREIGN PATENT DOCUMENTS

EP   1162805   4/2001

(Continued)

OTHER PUBLICATIONS

3GPP TS 26.233 V5.0.0 (Mar. 2002); $3^{rd}$ Generation Partnership Project; "Technical Specification Group Services and System Aspects; Transparent end-to-end packet switched streaming service (PSS), General Description"; (Release 5).

(Continued)

*Primary Examiner*—Matthew D Anderson
*Assistant Examiner*—Bobbak Safaipour
(74) *Attorney, Agent, or Firm*—Alfred A. Fressola; Ware, Fressola, Van Der Sluys & Adolphson LLP (57) ABSTRACT

The invention relates to a method for enabling a content provider initiated delivery of a content clip to a mobile terminal 4 via a communication network, which communication network comprises different types of radio access networks 1,2, and which content clip is required to be delivered via a specific type of radio access network. In order to enable such a delivery, it is proposed that in case it is determined that the mobile terminal 4 does not access the communication network via a radio access network 2 of the type required for the delivery of the content clip, a handover of the mobile terminal 4 to a radio access network 2 of the required type is triggered. The content clip can then be delivered to the mobile terminal 4. The invention relates equally to a corresponding system, to a corresponding communication network and to elements performing the proposed steps.

30 Claims, 2 Drawing Sheets

U.S. PATENT DOCUMENTS

| | | | |
|---|---|---|---|
| 6,594,242 B1 * | 7/2003 | Kransmo | 370/331 |
| 6,804,533 B1 * | 10/2004 | Makinen | 455/552.1 |
| 7,047,036 B2 * | 5/2006 | Shaheen et al. | 455/552.1 |
| 7,092,733 B2 * | 8/2006 | Mukai et al. | 455/552.1 |
| 7,181,237 B2 * | 2/2007 | Stockhusen | 455/552.1 |
| 7,215,962 B2 * | 5/2007 | Faerber | 455/437 |
| 2001/0017850 A1 | 8/2001 | Kalliokulju et al. | |
| 2002/0028654 A1 * | 3/2002 | Gleyzes et al. | 455/3.01 |
| 2002/0032032 A1 * | 3/2002 | Haumont et al. | 455/436 |
| 2002/0061749 A1 * | 5/2002 | Hunzinger | 455/436 |
| 2002/0106985 A1 * | 8/2002 | Sato et al. | 455/3.01 |
| 2003/0022624 A1 * | 1/2003 | Sato | 455/13.1 |
| 2003/0114158 A1 * | 6/2003 | Soderbacka et al. | 455/436 |
| 2003/0119508 A1 * | 6/2003 | Gwon et al. | 455/436 |
| 2003/0169725 A1 * | 9/2003 | Ahmavaara et al. | 370/352 |
| 2004/0029524 A1 * | 2/2004 | Zein Al-Abedeen et al. | 455/3.01 |

FOREIGN PATENT DOCUMENTS

| | | | |
|---|---|---|---|
| WO | WO 01/31963 | * | 5/2001 |
| WO | WO 0131963 | | 5/2001 |
| WO | WO 0189251 | | 11/2001 |
| WO | WO 02/11398 | | 2/2002 |
| WO | WO 0211398 A1 | * | 2/2002 |
| WO | WO 03/053091 | | 6/2003 |

OTHER PUBLICATIONS

3GPP TS 26.234 V4.3.0 (Mar. 2002); $3^{rd}$ Generation Partnership Project; "Technical Specification Group Services and System Aspects; Transparent end-to-end packet switched streaming service (PSS), Protocols and codecs", (Release 4).

$3^{rd}$ Generation Partnership Project (3GPP) Technical Specification (TS) 22.129 Version 5.1.0 (Dec. 2001), "Handover Requirements between UTRAN and GERAN or other Radio," Release 5, 2001.

ETSI TS 123 140 V5.2.0: "Functional description; Stage 2 (3GPP TS 23.140 version 5.2.0 Release 5)" Digital Cellular Telecommunications System (Phase 2+) (SGM); Universal Mobile Telecommunications System (UMTS); Multimedia Messaging Service (MMS) (Mar. 2002).

ETSI TS 123 060 v3.11.0; "General Packet Radio Service (GPRS) Service Description; Stage 2 (3GPP TS 23.060 version 3.11.0 Release 1999)" Digital Cellular Telecommunications System (Phase 2+) (GSM); Universal Mobile Telecommunications System (UMTS) (Mar. 2002).

3GPP TS 25.413 V3.4.0 (Dec. 2000): $3^{rd}$ Generation Partnership Project; Technical Specification Group Radio Access Network; UTRAN Iu Interface RANAP Signalling (Release 1999).

* cited by examiner

ENABLING A CONTENT PROVIDER INITIATED CONTENT DELIVERY VIA A SPECIFIC RADIO ACCESS NETWORK

CROSS REFERENCE TO RELATED APPLICATIONS

This application is for entry into the U.S. national phase under § 371 for International Application No. PCT/IB02/01046 having an international filing date of Apr. 3, 2002, and from which priority is claimed under all applicable sections of Title 35 of the United States Code including, but not limited to, Sections 120, 363 and 365(c).

FIELD OF THE INVENTION

The invention relates to a method for enabling a content provider initiated delivery of a content clip to a mobile terminal via a communication network, which communication network comprises radio access networks of at least two different types, and which content clip provided by said content provider is required to be delivered to said mobile terminal via a radio access network of a specific one of said at least two types. The invention relates equally to an assembly of elements connecting a communication system to a content server, to a communication system comprising such an assembly of elements and a communication network, and to a communication network.

BACKGROUND OF THE INVENTION

It is known from the state of the art to enable a content provider to deliver content to a mobile terminal via a communication network. The content provider produces and provides a content, e.g. a video clip with BBC news. The actual delivery of the content is then usually taken care of by a service provider, e.g. a network operator, who delivers the content provided by the content provider to the terminal.

It is also known to enable a "push" delivery of content, i.e. a delivery initiated by the content provider not by a request of a user of a mobile terminal.

In a provider initiated delivery of a content, a content clip can be delivered to a mobile terminal more or less automatically as soon as the clip becomes available, e.g. as part of a multimedia message. The delivery can be organized in a way that it does not require any user actions like clicking on a corresponding uniform resource locator (URL) for retrieving the content clip. An automatic delivery of content clips has to be supported by the mobile terminal to which it is directed. Further, it typically requires that the user of the mobile terminal has subscribed beforehand to a service providing these content clips. It is possible to enable a user to order a content directly from the respective content provider or via a service provider.

The communication network which is made use of for delivering the content may comprise different types of radio access networks for enabling an access of mobile terminals. Such different types of radio access networks provided by a single communication network can be e.g. a 3G (3rd generation) radio access network and a 2G (2nd generation) radio access network, or within a 3G system an UTRAN (universal mobile telecommunication services terrestrial radio access network) employing WCDMA (wideband code division multiple access) and a GSM (global system for mobile communications) radio access network.

Further, mobile terminals have been proposed that are able to access a communication network via different types of radio access networks and thus via different radio access technologies (RAT). Such mobile terminals are referred to as multi-mode terminals. One example for a multi-mode terminal is a 2G/3G dual-mode terminal.

In order to enable a comprehensive use of such multi-mode mobile terminals, it has also been proposed that a communication network providing different radio access technologies should support an intersystem handover of a multi-mode mobile terminal between these technologies.

The network signaling employed for performing an intersystem handover between UMTS (universal mobile telecommunication services) and GSM is described for example in the technical specification 3GPP TS 23.060 V3.6.0 (2001-01): "General Packet Radio Service (GPRS); Service description; Stage 2 (Release 1999)".

There are several reasons for which a change of the radio access technology is enabled.

The most important reason for an intersystem handover is differences of coverage and quality in the communication system. In some situations, the coverage of a first radio access system to which a moving mobile terminal is currently connected may end. Moreover, the radio connection quality provided by this first radio access system may degrade below a given threshold value. If at the same time, another radio access system still provides coverage and/or a better radio connection quality, an intersystem handover can guarantee a continued and satisfactory supply of the mobile terminal. The first radio access system is typically a WCDMA system and the second radio access system a GSM/GPRS system.

Another essential reason for an intersystem handover is load, i.e. the current amount of traffic in different radio access systems. When the load in a first radio access system exceeds a pre-defined threshold value, an overflow of mobile terminals can be handed over to another radio access system. In this case, the first radio access system is typically GSM/GPRS and the second radio access system WCDMA.

A third reason for an intersystem handover is QoS (quality of service) requirements of requested services. The operator of the communication system defines service based handover criteria according to its preferences. These criteria are then stored in a service priority table in the core network, which initiates the handover. The same table resides additionally in the radio network controller (RNC) of an UTRAN of the communication system. The table in the RNC can be used in case the RNC receives no handover information from the core network. In an exemplary assignment of services to different radio access technologies, GSM may be preferred for speech and WCDMA for packet data, while circuit data has to be transmitted using WCDMA. An additional criterion for a service based handover is load, load and service based handover thus being a more accurate term than service based handover.

As specified for example in the technical specification 3GPP TS 25.413 V3.4.0 (2000-12): "UTRAN Iu Interface RANAP Signaling (Release 1999)", a service based handover from a 3G UTRAN to a 2G GSM radio access network is implemented by an optional parameter called "Service Handover" in the RANAP (radio access network application part) messages "RAB Assignment Request" and "Relocation Request" on the Iu interface between the core network and an UTRAN. Three values are defined for this parameter, "HO to GSM should be performed", "HO to GSM should not be performed" and "HO to GSM shall not be performed". Thus, the core network is not able to force the RNC to carry out a handover from a 3G to a 2G radio access network, but only to propose a handover. The final decision is taken by the RNC based on additional criteria like load, coverage and radio connection quality. Furthermore, in load and service based handovers, an RNC hands mobile terminals over to a base station subsystem (BSS) periodically and in groups, not immediately and on an individual basis.

A problem that may result in the delivery of content to a multi-mode mobile terminal and that cannot be solved with the currently known methods relates to licensing. In the media world, it is a common approach to provide a license for distributing a specific content only through a certain access, e.g. for TV and radio broadcasting via cable, via a terrestrial access, i.e. analog, digital, AM, FM, HF, UHF, and/or VHF, or via satellite systems. In mobile communications, in contrast, content licenses are rather new. Still, some content providers have already sold exclusive licenses to mobile communication network operators and to other service providers for providing a certain content on a limited radio access spectrum, e.g. GSM and UMTS bands or technologies. An operator typically has both, 2G and 3G networks, and is able to provide a lot of content via 3G radio access to 3G/2G dual-mode terminal users. However, if this operator has only a 2G license for a certain content, a technical solution to provide the licensed content to its dual-mode subscribers on the 2G band would be useful. When the dual-mode mobile terminal of the dual-mode subscriber tries to access the 2G-only content via the 3G radio access network, it must be moved to the 2G system in order to enable the access. After content delivery by means of download, streaming or MMS (multimedia messaging service) via 2G radio access network, the terminal can either be moved to the 3G system or stay in the 2G system.

Further, a situation may arise in which a content is to be delivered which requires a specific radio access technology. A 2G/3G mobile terminal, for example may operate either in a 3G WCDMA system or in a 2G GSM system. The WCDMA system is then regularly the preferred system. GSM, however, has some services which do not exist in 3G, for example transparent facsimile.

The current 3GPP specifications treat UTRAN, GSM and GERAN radio access cells equally, i.e. there are no strong means for the network operator to guide a mobile terminal towards the most suitable radio access technology. It is known to favor one or another public land mobile network (PLMN), location area (LA), routing area (RA) or cell based on defined criteria. However, cells of different radio access technologies may be mixed in a single PLMN, LA or RA, and no method has been proposed so far for forcing the mobile terminal to a specific radio access technology, and not even for favoring a certain radio access technology. Only if a requested service cannot be provided in the current serving cell, the call may be handed over to another cell by the network, or the call may be cleared.

The European patent application EP 1 162 805 A1 describes a delivery of content upon a request of a user, in particular a request via a mobile terminal. It is proposed that due to the high costs, only a reduced content is delivered to the mobile terminal, while the full content is provided to an alternate system, in particular a wired system. Providing the full content to this alternate system can be realized e.g. by means of a "push" delivery to an internet connected data processing system. The document does not deal, however, with the requirement of delivering content to a mobile terminal via a specific type of radio access network in a "push" delivery.

SUMMARY OF THE INVENTION

It is an object of the invention to enable a content provider initiated delivery of a content, which content is to be delivered to a user of a mobile terminal over a communication network via a predetermined type of radio access network.

This object is reached according to the invention with a method which comprises as a first step determining the type of radio access network which is required for delivering the content clip. The required type is determined based on an indication associated to the content clip. Such an indication may in particular be provided by the content provider together with the content clip. In addition, the type of radio access network is determined via which the mobile terminal to which the content clip is to be delivered currently accesses the communication network. In case the mobile terminal accesses the communication network currently via a radio access network of a different type than required for the delivery of the content clip, a handover of the mobile terminal to a radio access network of the required type is triggered. Finally, the content clip is delivered to the mobile terminal via the radio access network of the type required for delivering the content clip.

It is to be noted that the term handover is meant to include as well cell reselections.

The object of the invention is equally reached with a corresponding communication system. This system comprises a communication network with radio access networks of a first type and of a second type and with means for performing an intersystem handover of a mobile terminal from a radio access network of the first type to a radio access network of the second type. The system further comprises a mobile terminal with means for accessing the communication network via radio access networks of the first and of the second type. The system moreover comprises an arrangement of at least one element. This arrangement can be external to the communication network or form a part of the communication network. In the first case, it can be for example a MMS relay and/or server, which may co-operate with other elements of the arrangement. An MMS relay/server is defined e.g. in the technical specification 3GPP TS 23.140 V5.1.0 (2001-12): "Multimedia Messaging Service (MMS); Functional description; Stage 2 (Release 5)" to be responsible for storage and notification, reports, and general handling of messages. The arrangement is employed for connecting a content server to the communication network, which content server provides upon the initiation of a content provider content clips that are to be delivered to a mobile terminal over the communication network and via a radio access network of the second type. The arrangement comprises means for carrying out the steps of the proposed method.

The object of the invention is also reached with such an arrangement of at least one element. The proposed arrangement thus comprises means for receiving content clips from a content server, and means for performing the steps of the proposed method.

Finally, the object of the invention is reached with a corresponding communication network enabling a handover for a content provider initiated delivery of a content clip.

The invention proceeds from the idea that a possibility might be provided for determining for a content clip provided by a content provider whether the content clip is to be delivered to a mobile terminal via a specific radio access network. Then, a handover of the mobile terminal to which the content clip is directed may be triggered, in case this mobile terminal is currently accessing the communication network via another one than the required radio access network.

It is an advantage of the invention that a provider initiated content delivery is enabled even if the mobile terminal to which the content is directed is currently accessing the communication network via another type of radio access network than required for the content.

Preferred embodiments of the invention become apparent from the subclaims.

The content clip provided by the content provider can be included in some message, e.g. in a multimedia message but also some other message. Such a message may comprise for example an extension header indicating the type of radio access network required for delivering the content clip. It is to be noted, though, that the indication only has to be provided together with the content clip. It may thus also be included e.g. in a metadata file interlinked to the message.

In one possible embodiment of the invention, all content clips originating from a specific content provider have to be delivered via a specific type of radio access network. In this case, the origin of the content clip may constitute the indication of the type of radio access network required for delivering the content.

In another embodiment of the invention, the indication, whether a content clip originating from a content provider has to be delivered via a specific type of radio access network, is requested from a network entity after the reception of the content clip and before delivery to the user of the mobile terminal.

In yet another embodiment of the invention, a content clip originating from a content provider is examined, e.g. by an MMS relay/server, and based on the results of the examination, it is concluded whether the content clip has to be delivered via a specific type of radio access network.

In an advantageous embodiment of the invention, the content clip provided by the content provider is first stored in a database. From this database, the content clip can be retrieved as soon as it is known that the mobile terminal to which the content clip is to be delivered accesses the communication network via a radio access network of the type required for delivering the content clip.

Even though a content clip will usually be provided due a service subscribed by the user of the mobile terminal, the mobile terminal might not be available for receiving the content clip. It is therefore proposed that a notification is transmitted to the mobile terminal, which indicates that the mobile terminal may request a delivery of a provided content clip. A possibly required handover of the mobile terminal is then only triggered upon a request by the mobile terminal to deliver the content clip. Equally, the content clip is only delivered to the mobile terminal upon this request by the mobile terminal.

The content provider will commonly provide together with a content clip an identification of the mobile terminal to which the content clip is to be delivered. More specifically, this identification might be an MSISDN associated to a SIM (subscriber identity module) or USIM (UMTS SIM) in the mobile terminal. The identification is thus associated to a mobile subscriber in general, and to a specific mobile terminal as long as it is connected to this SIM or USIM. In a preferred embodiment of the invention, a list stored in some storing means comprises the identification of all subscribers allowed to access the communication network via at least two different types of radio access networks. The provided identification of the subscriber can then be compared with the stored list. A handover is only triggered in case the mobile terminal to which the content clip is to be delivered can be determined to belong to a dual-mode subscriber.

The type of radio access network to which the mobile terminal is currently connected can be determined based on an available, stored information about the current connection of mobile terminals, e.g. of all mobile terminal having subscribed to a service. Such information may include information about the currently used radio access technology, about the type of the mobile terminal and about the subscription of the mobile terminal. The information can be provided each time a mobile terminal accesses the communication network. This information may also be used to verify whether a dual-mode subscriber is currently using a dual-mode mobile terminal and to prevent a handover in case a dual-mode subscriber is currently not using a dual-mode mobile terminal.

The content provider can provide the content clip in particular to an MMS relay/server which is connected to the communication network and which triggers the handover of a mobile terminal if required. The MMS relay/server can also determine whether a handover is required. Alternatively, this task can be performed by a unit connected to the MMS relay/server. Such a unit connected to the MMS relay/server may also store information required in the unit or in the MMS relay/server for determining whether a handover is to be triggered.

When a handover was triggered, the content clip is preferably delivered only after a notification that the triggered handover has been completed.

The invention can be implemented for the packet switched (PS) domain and/or for the circuit switched (CS) domain. Preferably, the invention is implemented at least for the PS domain, since all 2G/3G mobile terminals should support a processing of PS data. The handover is triggered in the PS domain with a network controlled cell re-selection (NCCRS) trigger to the GGSN (serving GPRS support node) and the SGSN (gateway GPRS support node) and for the CS domain with a trigger to the NAS (non access stratum) and the MSC (mobile switching center). In case an MMS relay/server supports only the delivery of multimedia messages in the PS domain, only NCCRS triggers are needed.

Preferably, at least one of the radio access networks of the communication network is a 3G radio access network, while at least one other of the radio access networks is a 2G radio access network.

Evidently, though, the invention can also be employed with communication networks comprising other at least two different types of radio access networks, the invention only requiring that there is at least one kind of intersystem handover enabled which is initiated by a content provider.

Accordingly, the intersystem handover of the invention cannot only be implemented for WCDMA and GSM/GPRS, but for any systems between which such an intersystem handover may be of interest, for instance also for a handover of a mobile terminal from a WLAN (wireless local area network) to GSM.

BRIEF DESCRIPTION OF THE FIGURES

Other objects and features of the present invention will become apparent from the following description of an exemplary embodiment of the invention considered in conjunction with the accompanying drawings, wherein.

DETAILED DESCRIPTION OF THE INVENTION

Figure 1:
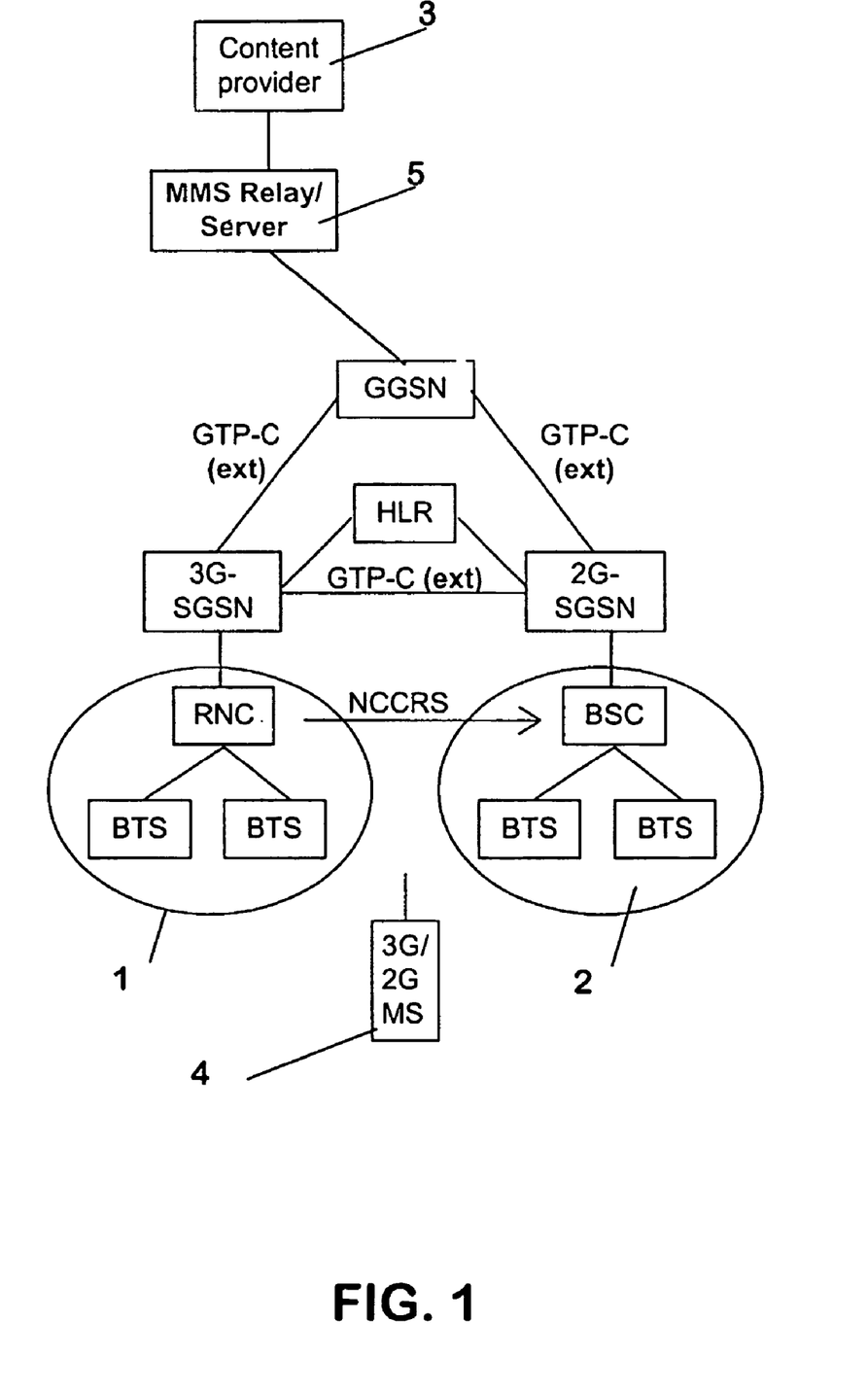
FIG. 1 shows a communication system in which an embodiment of the method according to the invention can be employed.

FIG. 1 shows a communication system according to the invention, which enables a content provider initiated delivery of content to a mobile terminal via a mobile communication network.

The depicted communication system comprises a 3G UTRAN 1 and a 2G GSM radio access network 2. The UTRAN 1 comprises in turn base stations BTS connected to a radio network controller RNC, while the GSM access network comprises base stations BTS connected to a base station controller BSC.

The RNC of the UTRAN is further connected via a 3G serving GPRS support node (3G-SGSN) to a home location register HLR and a gateway GPRS support node GGSN. The BSC of the GSM access network is connected in addition via a 2G-SGSN to the HLR and the GGSN.

SGSNs, HLR and GGSN belong to the core network of the communications system. The ensemble of 2G and 3G radio access networks 1, 2 and the core network will also be referred to as mobile communication network.

The SGSNs are switches that serve a mobile terminal in its current location for packet switched services. The GGSN is a switch of the core network providing a connection for packet switched services to external networks. For this function, the GGSN is connected on the one hand for multimedia messaging services via an MMS relay/server 5 to a content server 3 of a content provider.

The communication system of FIG. 1 further comprises a mobile terminal 4. This terminal 4 is a 2G/3G dual-mode station, which supports GSM/GPRS and WCDMA. The mobile terminal 4 is thus capable of accessing the as well the UTRAN 1 as the GSM radio access network 2 of the mobile communication network via any of the respectively provided base stations BTS.

The operator of the mobile communication network has a license for delivering content clips for a specific MMS via the 2G radio access technology to mobile terminals. The operator does not have the license for delivering these content clips via the 3G radio access technology. The user of the depicted dual-mode mobile terminal 4 has subscribed to this specific MMS.

The MMS relay/server 5 stores a list of the MSISDNs (Mobile Subscriber Integrated Services Digital Network numbers) of all those service subscribers which use a 2G/3G mobile terminal, thus also the MSISDN of mobile terminal 4.

Whenever one of these subscribers activates a packet data protocol (PDP) context via a mobile terminal, the MMS relay/server 5 further receives from the GGSN information on the used radio access technology RAT, on the kind of the used mobile terminal, i.e. on the user equipment UE, and on subscriptions SUBS of the respective mobile terminal. This information is equally stored by the MMS relay/server 5. Alternatively, the information could be provided to and stored in some storage element connected to the MMS relay/server 5, e.g. an Id Proxy.

Figure 2:
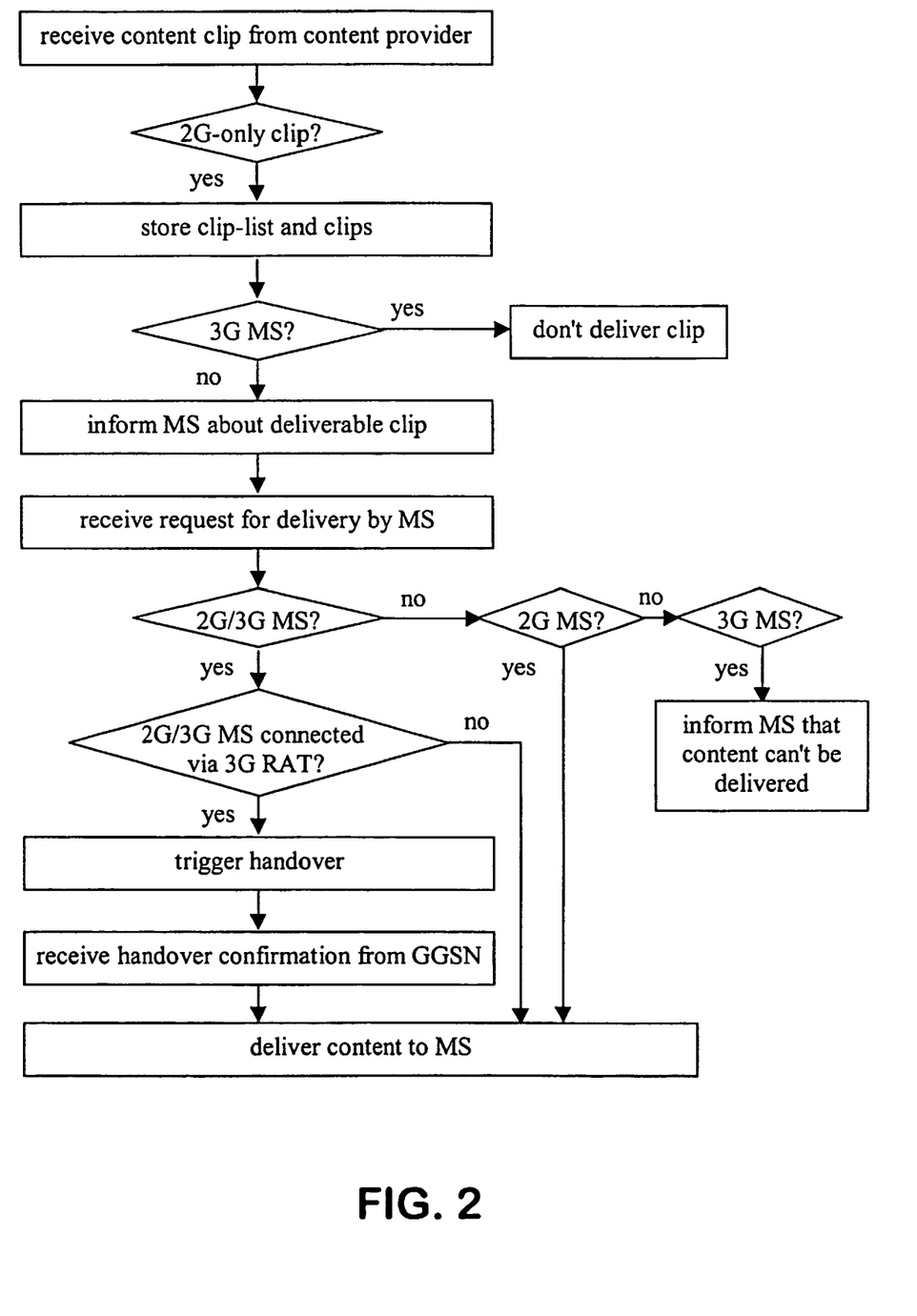
FIG. 2 is a flow chart illustrating an embodiment of the method according to the invention implemented in an MMS relay/server of the communication system of FIG. 1.

The delivery of a 2G-only content provided by the content provider 3 for an MMS subscribed by the depicted mobile terminal 4 will now be described with reference to FIG. 2. FIG. 2 illustrates a part of the procedure realized in the MMS relay/server 5 for enabling the delivery of content originating from the content provider 3. In an exemplary initial state, the mobile terminal 4 has a non-real time (NRT) packet switched (PS) connection in the UTRAN 1, and the corresponding information on RAT, UE and SUBS is stored in the MMS relay/server 5 or in a connected storage element.

The content provider 3 provides a multimedia message comprising a content clip to the MMS relay/server 5, whenever a new content clip for an MMS subscribed by some user is available, e.g. a 2G-only content clip for the MMS subscribed by the user of mobile terminal 4.

In a first step, the MMS relay/server 5 thus receives automatically a multimedia message with a content clip from the content server of the content provider 3.

Before the multimedia message can be delivered by the MMS relay/server 5 to its destination, the type of radio access technology required for the comprised content has to be determined.

The multimedia message provided by the content provider 3 comprises to this end an extension header in its MIME (Multipurpose/Multimedia Internet Mail Extension) multipart header. This extension header includes an indication that the comprised content clip is a 2G-only content clip as well as the MSISDN of the subscriber for which the content clip is intended.

Alternatively, the indication that the comprised content clip is a 2G-only content clip can be included within the protocol layer that is used to deliver the multimedia message from the content provider 3 to the MMS relay/server 5.

Further alternatively, the MMS relay/server 5 may be configured such that it knows that all multimedia messages originating from a certain content provider 3 have 2G-only content.

Due to the provided MSISDN of the subscriber, a transmission of the IP addresses of the respective subscriber from the GGSN to the MMS relay/server 5, which IP addresses correspond to the established PDP contexts, is not required for the delivery of the multimedia message. In the described example, the MMS relay/server 5 detects that the received multimedia message comprises a 2G-only content clip.

The MMS relay/server 5 stores in its database a list of all received multimedia messages which are to be delivered and which contain 2G-only content clips. In addition, the MMS relay/server 5 stores in its database the corresponding multimedia messages. Based on the newly received multimedia message with a 2G-only content, the MMS relay/server 5 supplements its database.

The MMS relay/server 5 moreover determines, whether the mobile terminal 4 for which the content clip is intended is a 3G-only terminal. In case it is a 3G terminal, the content clip will not be delivered.

Otherwise, the MMS relay/server 5 transmits an MMS notification to the mobile terminal 4 of the subscriber to which the subscribed content clip is directed. The notification comprises a uniform resource indicator (URI) pointing at the MMS relay/server 5 and the required information for activating an MMS User Agent in the mobile terminal 4. As a result, the terminal 4 requests the MMS relay/server 5 to deliver the multimedia message. Alternatively, the user agent could inform the user of the mobile terminal 4 about the new MMS notification. The user may then click a button in the terminal 4 to request a delivery of the multimedia message.

The MMS relay/server 5 further determines based on the received MSISDN and the stored information on RAT, UE and SUBS, whether the mobile terminal to which the message is to be delivered is a dual-mode mobile terminal. In case the list of MSISDNs is stored in a storing unit, the MMS relay/server 5 could procure the information from this storing unit on the basis of the MSISDN of the mobile terminal to which a content clip is to be delivered.

In case it is determined that the received multimedia message with the 2G-only content clip is to be delivered to a 2G-only subscriber, the message can be delivered immediately upon the request by the mobile terminal of the subscriber. In case the received multimedia message with the 2G-only content clip is to be delivered to a 3G-only subscriber, the mobile terminal is informed that a provided content clip cannot be delivered.

In case the subscriber uses a dual-mode mobile terminal, however, the MMS relay/server 5 has to determine in addition whether the terminal is currently connected to the mobile communication network via a 2G or a 3G radio access network 1, 2. To this end, the MMS relay/server 5 maps the received MSISDN to the stored RAT, UE and SUBS information. In case the mobile terminal is a dual-mode terminal which is currently connected to a 2G radio access network 2, the stored message with the content clip can now be delivered to the mobile terminal.

In the described example, the MMS relay/server 5 determines that the mobile terminal 4 is a dual-mode terminal which is currently connected to a 3G radio access network 1. Since the content clip is only allowed to be delivered via 2G radio access technology, the MMS relay/server 5 knows now that it has to trigger a handover of the mobile terminal 4 to a 2G radio access network 2 before the content clip can be delivered.

The requirement of a handover could be determined alternatively in another network element, for example in an Id Proxy connected to the MMS relay/server 5. The Id Proxy would then simply provide the MMS relay/server 5 with an indication whether or not the MMS relay/server 5 has to trigger a handover of the mobile terminal.

For triggering the handover, the MMS relay/server 5 transmits a NCCRS trigger to the GGSN.

The handover of the mobile terminal 4 from the UTRAN 1 to the GSM access network 2 resulting from the NCCRS trigger by the MMS relay/server 5 is indicated in FIG. 1 with an arrow labeled "NCCRS". The details of the actual handover will be described further below.

The GGSN informs the MMS relay/server 5 when the handover of the mobile terminal 4 to a 2G radio access network 2 has been completed.

After having received the indication by the GGSN that the handover has been completed, the MMS relay/server 5 retrieves the stored multimedia message with the 2G-only content from its database and delivers the multimedia message to the mobile terminal 4 via GSM radio access network 2. The user agent of the terminal 4 can then present the received multimedia message on the screen of the terminal 4, either automatically or upon a request by the user of the terminal 4.

The MMS relay/server 5 moreover changes the stored RAT status of all IP addresses of the subscriber, since otherwise, the MMS relay/server 5 might produce wrong NCCRS triggers for subsequent content deliveries.

In the described embodiment of the invention, the MMS relay/server 5 will deliver a content clip to a mobile terminal only in case the mobile terminal has currently an active PDP context, since only in this case a valid information on RAT, UE and SUBS is available at the MMS relay/server 5 for the mobile terminal. In case the mobile terminal is not attached to the PS Core network when a multimedia message is provided by the content provider 3, the message is stored in the database of the MMS relay/server 5 until the mobile terminal performs the next Routing Area Update to the PS Core. In another embodiment of the invention, however, other criteria for the delivery of multimedia messages could be employed as well.

As becomes apparent from the above description, a new protocol between the MMS relay/server 5 and the GGSN is required for supporting NCCRS triggers form the MSMC to the GGSN and for supporting the delivery of RAT, UE and SUBS information from the GGSN to the MMS relay/server 5 or to a storage element connected to the MMS relay/server 5.

In the following, a possible handover procedure triggered by the MMS relay/server 5 will be described in more detail.

In case the MMS relay/server 5 determined that a handover is required for delivering the received multimedia message, it sends a content-based inter-system network controlled cell re-selection (CB IS NCCRS) trigger to the GGSN.

The CB IS NCCRS trigger is further conveyed in an optional field of an Update PDP Context Request message, to the 3G-SGSN. The 3G-SGSN interprets the message based on the optional field content as CB IS NCCRS trigger and triggers a service based cell reselection (SB IS NCCRS) in the RNC by means of a RAB assignment request. For the RNC, a service based cell reselection is the same as a content based cell reselection, since both use the same service handover information element parameters to trigger a cell re-selection in the RNC.

The RNC commands the mobile terminal to perform a cell re-selection in 2G. Then, a RAB Assignment Response is sent by the RNC to the 3G-SGSN and an Update PDP Context Response by the 3G-SGSN further to the GGSN. The mobile terminal is able to find a 2G cell by itself and transmits a routing area update request on the 2G side to the 2G-SGSN.

With a SGSN context request and response between 2G-SGSN and 3G-SGSN, the 2G-SGSN obtains the old SGSN Context of the mobile terminal from the 3G-SGSN. The 3G-SGSN includes an information in an optional field of the response message indicating that the mobile terminal has been moved to 2G due to content-based access reasons.

When a Cancel Location message is now received at the 3G-SGSN from the HLR, the Iu-interface is released with a message exchange between the 3G-SGSN and the RNC. In a subsequent BSS Packet Flow Context procedures, the 2G-SGSN indicates to the BSC in a CREATE-BSS-PFC message that a handover to the UTRAN shall not be performed. The reason for this value is that the mobile terminal shall not be moved immediately back to 3G while downloading 2G-only content via the 2G radio access, since this would violate the content license.

The above mentioned Routing Area Update Request of the mobile terminal is then accepted with a corresponding message by the 2G-SGSN.

Further messages are employed in a request/response message exchange between 2G-SGSN and GGSN for updating the PDP Context in the GGSN. The 2G-SGSN includes in the request a handover (CB IS NCCRS) information indicating that the handover is being progressed.

With a final message, the GGSN informs the MMS relay/server 5 that the handover (CB IS NCCRS) has been completed for the user for which the MMS relay/server 5 triggered the handover.

Now, the MMS relay/server 5 can deliver the received multimedia message containing the 2G-only content clip to the mobile terminal as described above.

After the handover of the mobile terminal 5 to the GSM access network, the mobile terminal 5 can be kept on the 2G side by including a parameter "HO to UMTS shall not be performed" into the handover message on the A interface from the core network to the BSC. The other two possible parameters are "HO to UMTS should be performed" and "HO to UMTS should not be performed".

When the mobile terminal 5 has switched again to idle mode, it will connect to the strongest 3G or 2G cell, unless the operator has given GSM cells a high priority in a WCDMA neighbor list. Such a high priority for GSM cells will keep the idle mobile terminal 5 in GSM, even if it receives stronger signals from WCDMA cells, as long as they remain below a predetermined maximum threshold level.

It is to be understood that the described embodiment of the invention constitutes only one of several possibilities of realizing the method, network element, mobile communication network and the communication system of the invention.

The invention claimed is:

1. A method comprising:
   receiving a content clip from a content server upon initiation of a content provider for delivery to a particular mobile terminal;
   determining a type of radio access network required for delivering said content clip to said mobile terminal via a communication network based on an indication associated to said content clip and determining the type of radio access network via which said mobile terminal currently accesses said communication network, wherein said communication network comprises radio access networks of at least two different types;
   in case said mobile terminal accesses said communication network currently via a radio access network of a different type than required for delivering said content clip, triggering a handover of said mobile terminal to a radio access network of said type required for delivering said content clip; and
   transmitting a notification to said mobile terminal, which notification indicates that said mobile terminal may request a delivery of said content clip received from said content server, wherein a handover of said mobile terminal to a radio access network of a type required for a delivery of said content clip is only triggered upon a request by said mobile terminal to deliver said content clip, and wherein said content clip is only delivered to said mobile terminal via said radio access network of said type required for delivering said content clip upon a request by said mobile terminal to deliver said content clip.

2. The method according to claim 1, wherein said content clip is included in a multimedia message.

3. The method according to claim 1, wherein an indication of the type of radio access network required for delivering said content clip is provided by said content provider together with said content clip.

4. The method according to claim 1, wherein all content clips provided by a specific content provider are required to be delivered via a specific type of radio access network, and wherein said indication associated to said content clip is given by an identification of the origin of said content clip.

5. The method according to claim 1, wherein an indication of the type of radio access network required for delivering said content clip is separately fetched from a network entity or extrapolated from the content clip.

6. The method according to claim 1, wherein said content clip is stored in a database until said mobile terminal to which said content clip is to be delivered is known to access said communication network via a radio access network of said type required for delivering said content clip.

7. The method according to claim 1, wherein an identification of a subscriber using said mobile terminal to which said content clip is to be delivered is compared with a stored list of identifications of mobile subscribers allowed to access said communication network via at least two different types of radio access networks, and wherein a handover is only triggered in case said subscriber is determined to be a subscriber which is able to access to said communication network via at least two different types of radio access networks.

8. The method according to claim 1, wherein said type of the radio access network to which said mobile terminal is currently connected is determined based on an available, stored information about the current connection of said mobile terminal.

9. The method according to claim 1, wherein said content clip is provided by said content provider to a multimedia messaging service relay and/or server connected to said communication network, which multimedia messaging service relay and/or server triggers said handover of said mobile terminal if required.

10. The method according to claim 9, wherein said multimedia messaging service relay and/or server determines whether a handover is required.

11. The method according to claim 9, wherein a unit connected to said multimedia messaging service relay and/or server determines whether a handover is required.

12. The method according to claim 1, wherein for a handover said multimedia messaging service relay and/or server transmits an network controlled cell re-selection trigger to the communication network.

13. The method according to claim 1, wherein in case of a triggered handover of a mobile terminal accessing said communication network via a different type of radio access network than required for delivering said content clip, said content clip is delivered to said mobile terminal upon a notification that said triggered handover has been completed.

14. The method according to claim 1, wherein at least one of said radio access networks of said communication network is a third generation radio access network, and wherein at least one other of said radio access networks of said communication network is a second generation radio access network.

15. An arrangement of at least one element for connecting a content server with a communication network, said arrangement comprising:
   a receiving component arranged to receive a content clip from said content server, which content clip is to be delivered upon initiation of a content provider to a particular mobile terminal attached to said communication network via a specific type of radio access network, said communication network comprising radio access networks of at least two different types;
   a determination component configured to determine a type of radio access network required for delivering said content clip to said mobile terminal via said communication network based on an indication associated to said content clip and configured to determine the type of radio access network via which said mobile terminal currently accesses said communication network;
   a notification component for transmitting a notification to said mobile terminal, which notification indicates that said mobile terminal may request a delivery of said provided content clip;
   a triggering component configured to trigger a handover of said mobile terminal to a radio access network of said type required for delivering said content clip, in case said mobile terminal accesses said communication network currently via a radio access network of a different type than required for delivering said content clip and further wherein a handover of said mobile terminal to a radio access network of a type required for a delivery of said content clip is only triggered upon a request by said mobile terminal to deliver said content clip; and
   a delivering component configured to cause a delivery of said content clip to said mobile terminal via said radio access network of said type required for delivering said content clip only upon a request by said mobile terminal to deliver said content clip.

16. A communication system comprising a communication network with radio access networks of a first type and of a second type and with processing components configured to perform an intersystem handover of a mobile terminal from a radio access network of a first type to a radio access network of a second type, said communication system further comprising at least one mobile terminal with an access component configured to access said communication network via a radio access network of said first type and a radio access network of said second type, and said communication system further comprising an arrangement of at least one element according to claim 15 for connecting a content server to said communication network.

17. The arrangement according to claim 15, comprising as one of said at least one element at least a multimedia messaging service relay and/or server, said multimedia messaging service relay and/or server including said receiving component and said triggering component.

18. The arrangement according to claim 17, comprising as a further one of said at least one element a storage component connected to said multimedia messaging service relay and/or server and configured to store information based on which a handover is determined.

19. The arrangement according to claim 17, comprising as a further one of said at least one element a processing component connected to said multimedia messaging service relay and/or server and including said determination component.

20. A communication network comprising radio access networks of at least two different types and handover components configured to perform an intersystem handover of a mobile terminal accessing said communication network via a radio access network of a first type to a radio access network of a second type upon an information received from an arrangement of at least one element connecting said communication network to a content server, which information indicates that a content clip has been received at said arrangement from a content server upon initiation of a content provider for delivery to a particular mobile terminal and that an intersystem handover is required for a delivery of the content clip such that said handover is only triggered upon a request by the mobile terminal to deliver said content clip, further comprising a notification component for transmitting a notification to said mobile terminal, which notification indicates that said mobile terminal may request a delivery of said content clip received from said content server; and further comprising a delivery component configured to cause the delivery of said content clip to said mobile terminal via said radio access network of said type required for delivering said content clip only upon a request by said mobile terminal to deliver said content clip.

21. An apparatus comprising:
a receiving component configured to receive a content clip from a content server upon initiation of a content provider for delivery to a particular mobile terminal;
a determination component configured to determine a type of radio access network required for delivering said content clip to said mobile terminal via a communication network based on an indication associated to said content clip and configured to determine the type of radio access network via which said mobile terminal currently accesses said communication network, wherein said communication network comprises radio access networks of at least two different types;
a notification component for transmitting a notification to said mobile terminal, which notification indicates that said mobile terminal may request a delivery of said provided content clip;
a triggering component configured to trigger a handover of said mobile terminal to a radio access network of said type required for delivering said content clip, in case said mobile terminal accesses said communication network currently via a radio access network of a different type than required for delivering said content clip and further wherein the handover of said mobile terminal to a radio access network of a type required for a delivery of said content clip is only triggered upon a request by said mobile terminal to deliver said content clip; and
a delivery component configured to cause a delivery of said content clip to said mobile terminal via said radio access network of said type required for delivering said content clip only upon a request by said mobile terminal to deliver said content clip.

22. The apparatus according to claim 21, wherein said content clip is included in a multimedia message.

23. The apparatus according to claim 21, wherein an indication of the type of radio access network required for delivering said content clip is provided by a content provider together with said content clip.

24. The apparatus according to claim 21, wherein all content clips provided by a specific content provider are required to be delivered via a specific type of radio access network, and wherein said determination component is configured to use an identification of the origin of a content clip as said indication associated to said content clip.

25. The apparatus according to claim 21, wherein said determination component is configured to fetch an indication of the type of radio access network required for delivering said content clip separately from a network entity or configured to extrapolate an indication of the type of radio access network required for delivering said content clip from the content clip.

26. The apparatus according to claim 21, further comprising a database configured to store said content clip until said mobile terminal to which said content clip is to be delivered is known to access said communication network via a radio access network of said type required for delivering said content clip.

27. The apparatus according to claim 21, further comprising a comparing component configured to compare an identification of a subscriber using said mobile terminal to which said content clip is to be delivered with a stored list of identifications of mobile subscribers allowed to access said communication network via at least two different types of radio access networks, wherein said triggering component is configured to trigger a handover only in case said subscriber is determined to be a subscriber which is able to access to said communication network via at least two different types of radio access networks.

28. The apparatus according to claim 21, wherein said determination component is configured to determine said type of the radio access network to which said mobile terminal is currently connected based on available, stored information about the current connection of said mobile terminal.

29. The apparatus according to claim 21, wherein said apparatus is arranged to connect a content server providing said content clip with said communication network.

30. An apparatus comprising:
means for receiving a content clip from a content server upon initiation of a content provider for delivery to a particular mobile terminal;
means for determining a type of radio access network required for delivering said content clip to said mobile terminal via a communication network based on an indication associated to said content clip and for determining the type of radio access network via which said mobile terminal currently accesses said communication network, wherein said communication network comprises radio access networks of at least two different types;

means for transmitting a notification to said mobile terminal, which notification indicates that said mobile terminal may request a delivery of said provided content clip;

means for triggering a handover of said mobile terminal to a radio access network of said type required for delivering said content clip, in case said mobile terminal accesses said communication network currently via a radio access network of a different type than required for delivering said content clip and further wherein the handover of said mobile terminal to a radio access network of a type required for a delivery of said content clip is only triggered upon a request by said mobile terminal to deliver said content clip; and means for causing a delivery of said content clip to said mobile terminal via said radio access network of said type required for delivering said content clip only upon a request by said mobile terminal to deliver said content clip.

* * * * *